(12) United States Patent
Sasagawa et al.

(10) Patent No.: US 11,731,331 B2
(45) Date of Patent: *Aug. 22, 2023

(54) PLASTICIZING APPARATUS, INJECTION MOLDING APPARATUS, AND THREE-DIMENSIONAL SHAPING APPARATUS

(71) Applicant: SEIKO EPSON CORPORATION, Tokyo (JP)

(72) Inventors: Kakeru Sasagawa, Matsumoto (JP); Kenta Anegawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/455,940

(22) Filed: Nov. 22, 2021

(65) Prior Publication Data

US 2022/0161476 A1    May 26, 2022

(30) Foreign Application Priority Data

Nov. 24, 2020 (JP) ................. 2020-194250

(51) Int. Cl.
| | | |
|---|---|---|
| *B29C 45/74* | (2006.01) | |
| *B29C 45/62* | (2006.01) | |
| *B29C 64/295* | (2017.01) | |
| *B33Y 30/00* | (2015.01) | |
| *B29C 64/209* | (2017.01) | |

(52) U.S. Cl.
CPC ............. *B29C 45/74* (2013.01); *B29C 45/62* (2013.01); *B29C 64/209* (2017.08); *B29C 64/295* (2017.08); *B33Y 30/00* (2014.12); *B29K 2995/0013* (2013.01)

(58) Field of Classification Search
CPC ....... B29C 45/62; B29C 45/361; B29C 45/68; B29C 45/875; B29C 45/78; B29C 45/1775

See application file for complete search history.

(56) References Cited

U.S. PATENT DOCUMENTS

| | | | |
|---|---|---|---|
| 2,705,342 A | 4/1955 | Hendry | |
| 3,866,669 A | 2/1975 | Gardiner | |
| 3,944,191 A | 3/1976 | Kasamatsu | |
| 3,954,366 A | 5/1976 | Fields | |
| 4,531,308 A | 7/1985 | Neilson et al. | |
| 5,121,329 A | 6/1992 | Crump | |
| 6,146,575 A * | 11/2000 | Huston | F04C 13/002 425/270 |

(Continued)

FOREIGN PATENT DOCUMENTS

| | | |
|---|---|---|
| CN | 102791460 | 11/2012 |
| JP | 09-070864 | 3/1997 |

(Continued)

*Primary Examiner* — Armand Melendez
(74) *Attorney, Agent, or Firm* — Workman Nydegger (57) ABSTRACT

A plasticizing apparatus that plasticizes a material includes: a drive motor; a screw rotated by the drive motor and having a groove forming surface in which a groove is formed; and a barrel having a facing surface that faces the groove forming surface and provided with a heater and a communication hole. The barrel includes a first member, and a second member having thermal conductivity different from that of the first member, and the second member is provided closer to the communication hole than the first member.

9 Claims, 7 Drawing Sheets

(56) References Cited

U.S. PATENT DOCUMENTS

| | | |
|---|---|---|
| 2003/0075833 A1 | 4/2003 | Thomson |
| 2007/0063378 A1 | 3/2007 | O'Donoghue |
| 2011/0159139 A1 | 6/2011 | Galati et al. |
| 2017/0008230 A1 | 1/2017 | Yuyama |
| 2017/0291364 A1 | 10/2017 | Womer |
| 2018/0236705 A1 | 8/2018 | Conrad |
| 2019/0168455 A1 | 6/2019 | Besim et al. |
| 2019/0358903 A1 | 11/2019 | Watanabe et al. |
| 2020/0338824 A1 | 10/2020 | Cardon et al. |
| 2021/0031422 A1 | 2/2021 | Yamashita |
| 2021/0031423 A1 | 2/2021 | Yamashita |
| 2021/0031444 A1 | 2/2021 | Yamashita |
| 2021/0370567 A1 | 12/2021 | Maruyama et al. |

FOREIGN PATENT DOCUMENTS

| | | |
|---|---|---|
| JP | 10-249892 | 9/1998 |
| JP | 3052603 | 9/1998 |
| JP | 2000-127214 | 5/2000 |
| JP | 2004-314399 | 11/2004 |
| JP | 2009-269182 | 11/2009 |
| JP | 2010-000752 | 1/2010 |
| JP | 2010-241016 A | 10/2010 |
| JP | 2013-184387 | 9/2013 |
| JP | 2019-202458 A | 11/2019 |
| JP | 2020-075397 | 5/2020 |
| WO | 2015/129733 | 9/2015 |

* cited by examiner

PLASTICIZING APPARATUS, INJECTION MOLDING APPARATUS, AND THREE-DIMENSIONAL SHAPING APPARATUS

The present application is based on, and claims priority from JP Application Serial Number 2020-194250, filed Nov. 24, 2020, the disclosure of which is hereby incorporated by reference herein in its entirety.

BACKGROUND

1. Technical Field

The present disclosure relates to a plasticizing apparatus, an injection molding apparatus and a three-dimensional shaping apparatus.

2. Related Art

An injection molding apparatus is known in which a material plasticized by a plasticizing apparatus is supplied to a cavity formed by a pair of dies and injected from a nozzle.

For example, JP-A-2010-241016 discloses a plasticizing and feeding apparatus including a barrel having a material inflow passage opened at one end surface, a rotor having an end surface that is in sliding contact with the one end surface of the barrel, and a spiral groove formed in the end surface of the rotor. The spiral groove is supplied with a material from a radially outer end portion, and the radially inner end portion communicates with an opening end of the material inflow passage of the barrel.

In the plasticizing and feeding apparatus including the rotor as described above, the material can be stably plasticized by a balance between conveyance of the material and melting of the material. Ideally, it is desirable that the material is in a solid state in a supply unit of the material which is the radially outer end portion of the spiral groove, and the material is in a molten state toward a radially inner end portion of the spiral groove. In the state in which the material is melted in the supply unit, a conveying force for conveying the material to the radially inner end portion is not obtained, discharge is not stabilized, and a bridge phenomenon in which a new material is not supplied occurs.

SUMMARY

An aspect of the present disclosure is directed to a plasticizing apparatus plasticizing a material, the plasticizing apparatus including: a drive motor; a screw rotated by the drive motor and having a groove forming surface in which a groove is formed; and a barrel having a facing surface that faces the groove forming surface and provided with a heater and a communication hole. The barrel includes a first member, and a second member having thermal conductivity different from that of the first member, and the second member is provided closer to the communication hole than the first member.

An aspect of the present disclosure is directed to an injection molding apparatus including: a plasticizing apparatus plasticizing a material into a molten material; and a nozzle injecting the molten material supplied from the plasticizing apparatus into a molding mold. The plasticizing apparatus includes a drive motor, a screw rotated by the drive motor and having a groove forming surface in which a groove is formed, and a barrel having a facing surface that faces the groove forming surface and provided with a heater and a communication hole, the barrel includes a first member, and a second member having thermal conductivity different from that of the first member, and the second member is provided closer to the communication hole than the first member.

An aspect of the present disclosure is directed to a three-dimensional shaping apparatus including: a plasticizing apparatus plasticizing a material into a molten material; and a nozzle discharging the molten material supplied from the plasticizing apparatus toward a stage. The plasticizing apparatus includes a drive motor, a screw rotated by the drive motor and having a groove forming surface in which a groove is formed, and a barrel having a facing surface that faces the groove forming surface and provided with a heater and a communication hole, the barrel includes a first member, and a second member having thermal conductivity different from that of the first member, and the second member is provided closer to the communication hole than the first member.

DESCRIPTION OF EXEMPLARY EMBODIMENTS

Hereinafter, preferred embodiments of the present disclosure will be described in detail with reference to drawings. The embodiments to be described below do not unduly limit contents of the present disclosure described in the claims. Further, all of configurations to be described below are not necessarily essential elements of the present disclosure.

Figure 1:
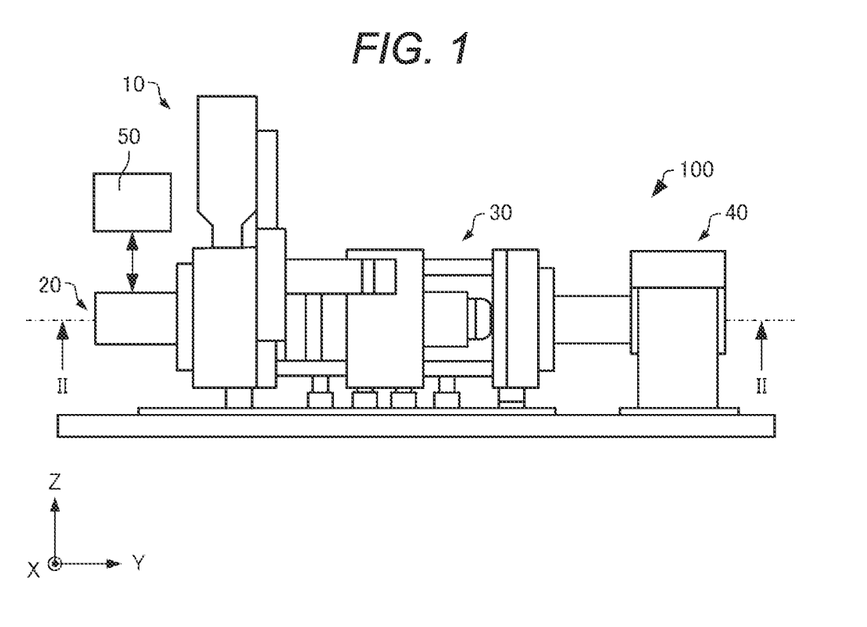
FIG. 1 is a diagram schematically showing an injection molding apparatus according to a first embodiment.

1. First Embodiment 1.1. Injection Molding Apparatus
1.1.1. Overall Configuration First, an injection molding apparatus according to a first embodiment will be described with reference to the drawings. FIG. 1 is a diagram schematically showing an injection molding apparatus 100 according to the first embodiment.

FIG. 1 shows an X axis, a Y axis, and a Z axis as three axes orthogonal to one another. An X-axis direction and a Y-axis direction are, for example, horizontal directions. A Z-axis direction is, for example, a vertical direction.

As shown in FIG. 1, the injection molding apparatus 100 includes, for example, a material supply unit 10, an injection unit 20, a mold unit 30, a mold clamping unit 40, and a control unit 50.

The material supply unit 10 supplies a material serving as a raw material to the injection unit 20. The material supply unit 10 is implemented by, for example, a hopper. A pellet-shaped or powdery material is supplied to the material supply unit 10.

The injection unit 20 plasticizes the material supplied from the material supply unit 10 to obtain a molten material. Then, the injection unit 20 injects the molten material toward the mold unit 30.

The term "plasticization" is a concept including melting, and means changing from a solid state to a state having fluidity. Specifically, in the case of a material in which glass transition occurs, the plasticization refers to setting a temperature of the material to be equal to or higher than a glass transition point. In the case of a material that does not cause the glass transition, the plasticization refers to setting the temperature of the material to a temperature equal to or higher than a melting point.

A cavity corresponding to a shape of a molded product is formed in the mold unit 30. The molten material injected from the injection unit 20 flows into the cavity. Then, the molten material is cooled and solidified to produce the molded product.

The mold clamping unit 40 opens and closes the mold unit 30. The mold clamping unit 40 opens the mold unit after the molten material is cooled and solidified. Accordingly, the molded product is discharged to the outside.

The control unit 50 is implemented by, for example, a computer including a processor, a main storage device, and an input and output interface that inputs and outputs a signal to and from the outside. The control unit 50 exerts various functions, for example, by the processor executing a program read into the main storage device. Specifically, the control unit 50 controls the injection unit 20 and the mold clamping unit 40. The control unit 50 may be implemented not by a computer but by a combination of a plurality of circuits.

1.1.2. Specific Configuration

Figure 2:
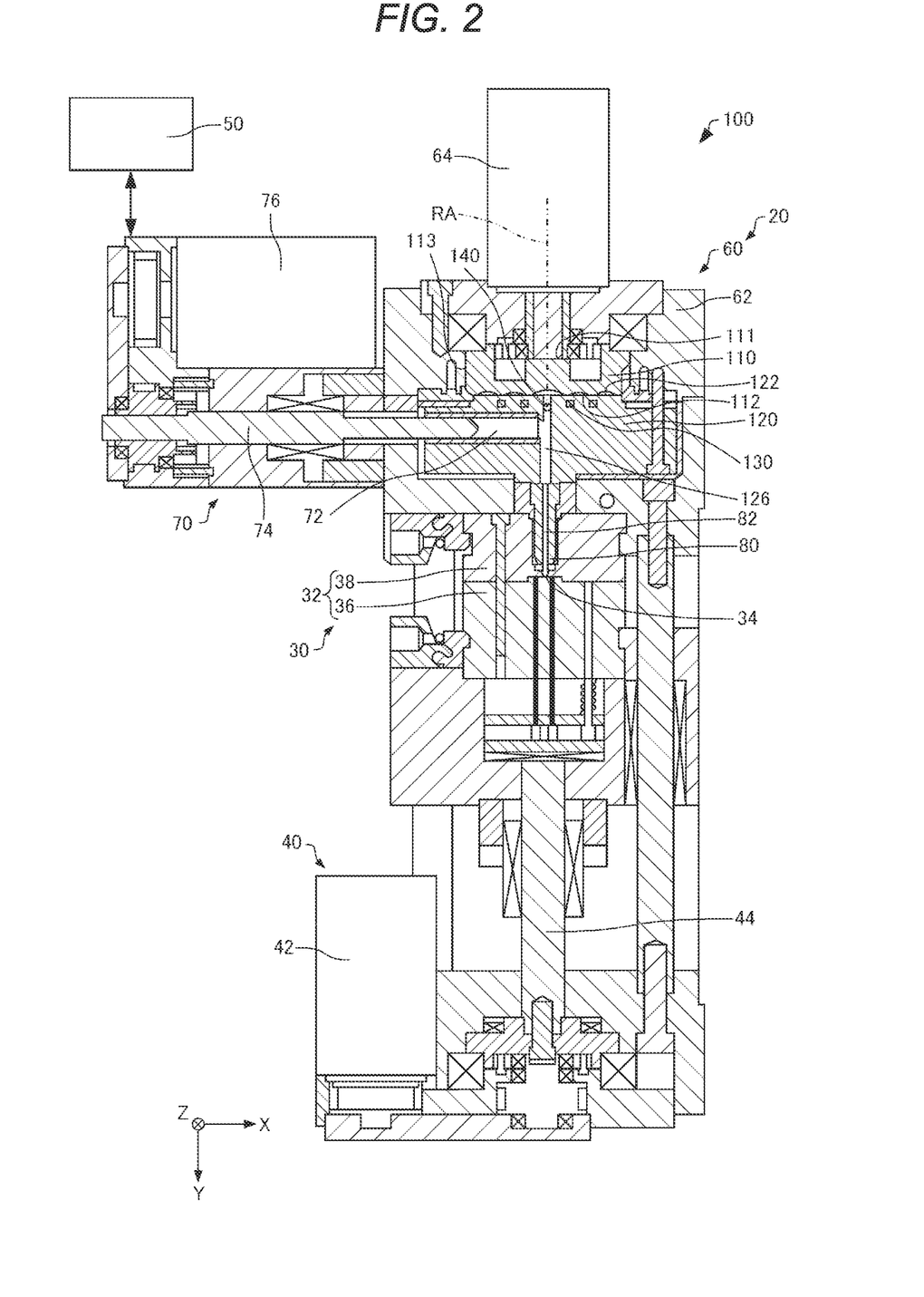
FIG. 2 is a cross-sectional view schematically showing the injection molding apparatus according to the first embodiment.

FIG. 2 is a cross-sectional view taken along line II-II of FIG. 1 schematically showing the injection molding apparatus 100. As shown in FIG. 2, the injection unit 20 includes, for example, a plasticizing apparatus 60, an injection mechanism 70, and a nozzle 80.

The plasticizing apparatus 60 plasticizes the material supplied from the material supply unit 10, generates a paste-shaped molten material having fluidity, and guides the molten material to the injection mechanism 70. The plasticizing apparatus 60 includes, for example, a screw case 62, a drive motor 64, a flat screw 110, a barrel 120, a heater 130, and a check valve 140.

The screw case 62 is a housing that accommodates the flat screw 110. The flat screw 110 is accommodated in a space surrounded by the screw case 62 and the barrel 120.

The drive motor 64 is provided in the screw case 62. The drive motor 64 rotates the flat screw 110. The drive motor 64 is controlled by the control unit 50.

Figure 3:
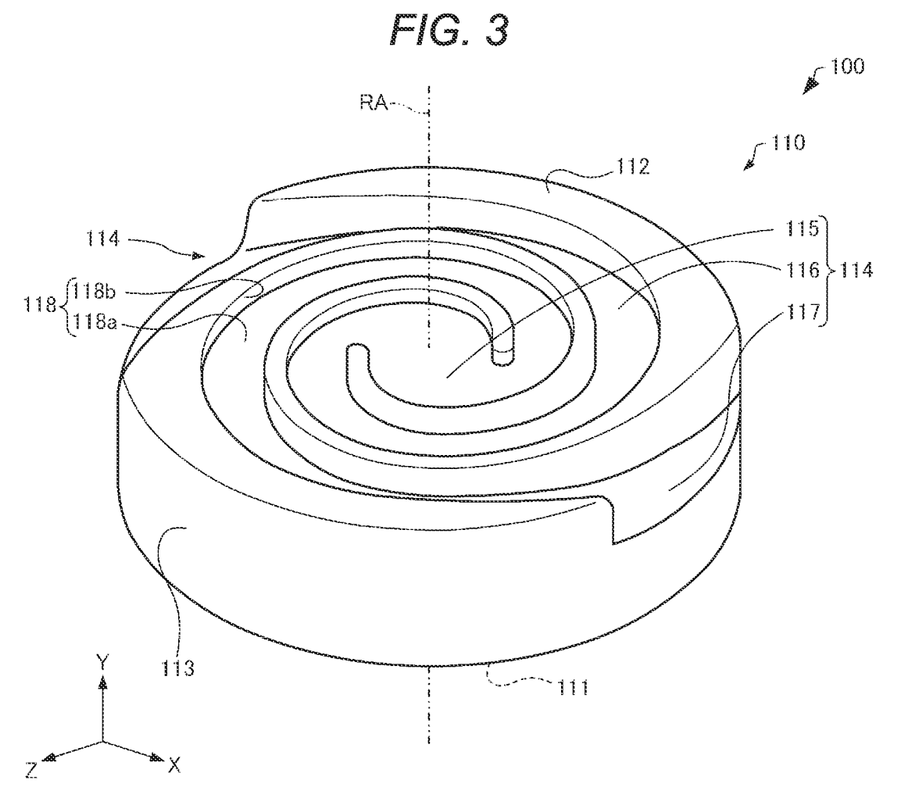
FIG. 3 is a perspective view schematically showing a flat screw of the injection molding apparatus according to the first embodiment.

The flat screw 110 has a substantially cylindrical shape in which a size in a direction of a rotation axis RA is smaller than a size in a direction orthogonal to the direction of the rotation axis RA. In an illustrated example, the rotation axis RA is parallel to the Y axis. The flat screw 110 is rotated about the rotation axis RA by a torque generated by the drive motor 64. The flat screw 110 has a main surface 111, a groove forming surface 112 opposite to the main surface 111, and a coupling surface 113 coupling the main surface 111 and the groove forming surface 112. Here, FIG. 3 is a perspective view schematically showing the flat screw 110. For convenience, FIG. 3 shows a state in which an upper-lower positional relationship is reversed from a state shown in FIG. 2. FIG. 2 illustrates the flat screw 110 in a simplified manner.

As shown in FIG. 3, a first groove 114 is formed in the groove forming surface 112 of the flat screw 110. The first groove 114 includes, for example, a groove central portion 115, a groove coupling portion 116, and a material introduction portion 117. The groove central portion 115 faces a communication hole 126 provided in the barrel 120. The groove central portion 115 communicates with the communication hole 126. The groove coupling portion 116 couples the groove central portion 115 and material introduction portion 117. In the illustrated example, the groove coupling portion 116 is provided in a spiral shape from the groove central portion 115 toward an outer periphery of the groove forming surface 112. The material introduction portion 117 is provided on the outer periphery of the groove forming surface 112. That is, the material introduction portion 117 is provided on the coupling surface 113 of the flat screw 110. The material supplied from the material supply unit 10 is introduced from the material introduction portion 117 into the first groove 114, passes through the groove coupling portion 116 and the groove central portion 115, and is conveyed to the communication hole 126 provided in the barrel 120. In the illustrated example, two first grooves 114 are provided.

The number of the first grooves 114 is not particularly limited. Although not illustrated, three or more first grooves 114 may be provided, or only one first groove 114 may be provided.

Figure 4:
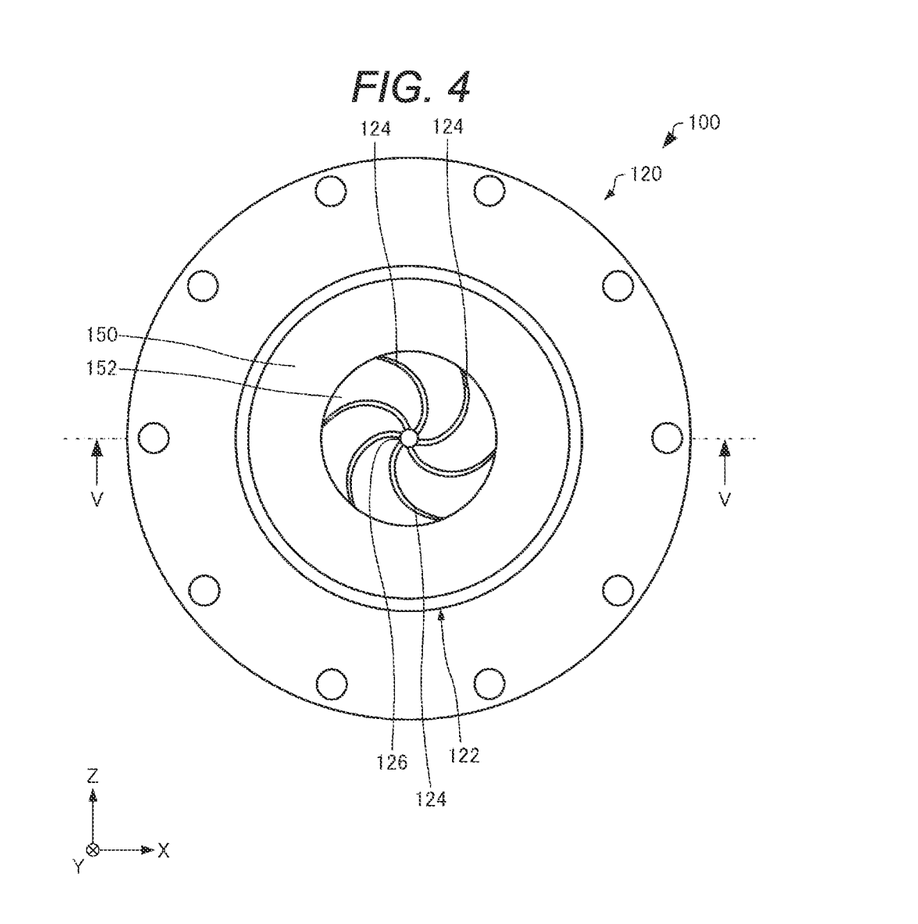
FIG. 4 is a diagram schematically showing a barrel of the injection molding apparatus according to the first embodiment.

As shown in FIG. 2, the barrel 120 is provided to face the flat screw 110. The barrel 120 has a facing surface 122 facing the groove forming surface 112 of the flat screw 110. A communication hole 126 is provided at a center of the facing surface 122. Here, FIG. 4 is a diagram schematically showing the barrel 120. For convenience, FIG. 2 shows the barrel 120 in a simplified manner.

As shown in FIG. 4, the facing surface 122 of the barrel 120 is provided with second grooves 124 and the communication hole 126. A plurality of second grooves 124 are provided. In the illustrated example, six second grooves 124 are provided, whereas the number of second grooves 124 is not particularly limited. The plurality of second grooves 124 are provided around the communication hole 126 when viewed from the Y-axis direction. One end of the second groove 124 is coupled to the communication hole 126, and the second groove 124 extends spirally from the communication hole 126 toward the outer periphery of the facing surface 122. The second groove 124 has a function of guiding the molten material to the communication hole 126.

The shape of second groove 124 is not particularly limited, and may be, for example, a linear shape. One end of the second groove 124 may not be coupled to the communication hole 126. Further, the second groove 124 may not be provided in the facing surface 122. However, in consideration of efficiently guiding the molten material to the communication hole 126, the second groove 124 is preferably provided in the facing surface 122.

As shown in FIG. 2, the heater 130 is provided in the barrel 120. In the illustrated example, the heater 130 includes four rod heaters provided in the barrel 120. The heater 130 heats the material supplied between the flat screw 110 and the barrel 120. An output of the heater 130 is controlled by the control unit 50. The plasticizing apparatus 60 generates the molten material by heating the material while conveying the material toward the communication hole 126 by the flat screw 110, the barrel 120, and the heater 130, and causes the generated molten material to flow out from the communication hole 126 to the injection mechanism 70.

The check valve 140 is provided in the communication hole 126. The check valve 140 can prevent a reverse flow of the molten material from the communication hole 126 to the first groove 114 provided in the flat screw 110.

The injection mechanism 70 includes, for example, a cylinder 72, a plunger 74, and a plunger driving unit 76. The cylinder 72 is a substantially cylindrical member coupled to the communication hole 126. The plunger 74 moves inside the cylinder 72. The plunger 74 is driven by the plunger driving unit 76 including a motor, a gear, and the like. The plunger driving unit 76 is controlled by the control unit 50.

The injection mechanism 70 executes a metering operation and an injection operation by sliding the plunger 74 in the cylinder 72. The metering operation refers to an operation of guiding the molten material located in the communication hole 126 into the cylinder 72 by moving the plunger 74 in a −X-axis direction away from the communication hole 126 and performing metering in the cylinder 72. The injection operation refers to an operation of injecting the molten material in the cylinder 72 into the mold unit 30 through the nozzle 80 by moving the plunger 74 in a +X-axis direction approaching the communication hole 126.

The nozzle 80 is provided with a nozzle hole 82 that communicates with the communication hole 126. The nozzle hole 82 injects the molten material supplied from the plasticizing apparatus 60 into a molding mold 32 of the mold unit 30. Specifically, by executing the metering operation and the injection operation described above, the molten material metered in the cylinder 72 is sent from the injection mechanism 70 to the nozzle hole 82 through the communication hole 126. Then, the molten material is injected from the nozzle hole 82 to the mold unit 30.

The mold unit 30 has the molding mold 32. The molding mold 32 is a die. The molten material sent to the nozzle hole 82 is injected from the nozzle hole 82 into a cavity 34 of the molding mold 32. Specifically, the molding mold 32 has a movable mold 36 and a fixed mold 38 facing each other, and has the cavity 34 between the movable mold and the fixed mold 38. The cavity 34 is a space corresponding to the shape of the molded product. The movable mold 36 and the fixed mold 38 are made of metal. The movable mold 36 and the fixed mold 38 may be made of ceramic or a resin.

The mold clamping unit 40 includes, for example, a mold driving unit 42 and a ball screw unit 44. The mold driving unit 42 includes, for example, a motor, and a gear. The mold driving unit 42 is coupled to the movable mold 36 through the ball screw unit 44. The driving of the mold driving unit 42 is controlled by the control unit 50. The ball screw unit 44 transmits power generated by the driving of the mold driving unit 42 to the movable mold 36. The mold clamping unit 40 opens and closes the mold unit 30 by moving the movable mold 36 by the mold driving unit 42 and the ball screw unit 44.

1.1.3. First Member and Second Member of Barrel

Figure 5:
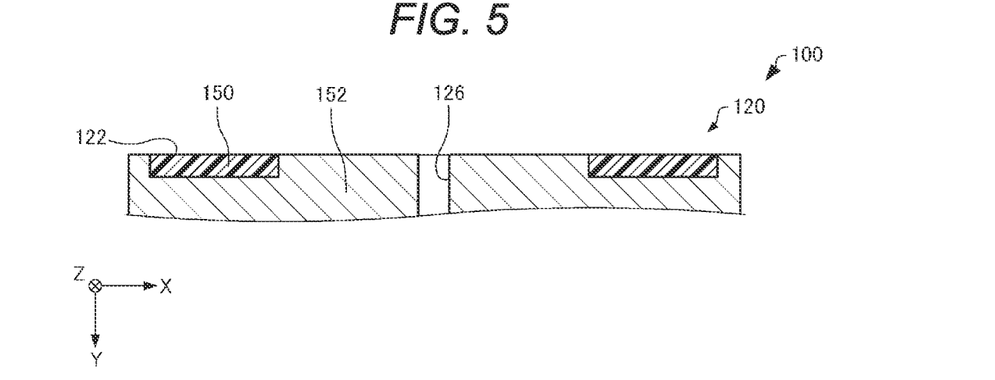
FIG. 5 is a cross-sectional view schematically showing the barrel of the injection molding apparatus according to the first embodiment.

FIG. 5 is a cross-sectional view taken along line V-V of FIG. 4 schematically showing the barrel 120. As shown in FIGS. 4 and 5, the barrel 120 includes a first member 150 and a second member 152.

The first member 150 is provided to be separated from the communication hole 126. The first member 150 is formed by subjecting the facing surface 122 of the barrel 120 to a surface treatment. For example, the first member 150 is formed by cutting a part of a disk-shaped second member 152 made of metal and fitting the first member 150 into the cut portion. The first member 150 has a shape surrounding the communication hole 126 when viewed from the Y-axis direction. In the example illustrated in FIG. 4, the shape of the first member 150 is a ring shape.

For example, the first member 150 may be formed by coating a part of the second member 152. As described above, the "surface treatment" includes cutting a certain member, coating a certain member, and the like.

The material of the first member 150 is, for example, a resin such as a polyether ether ketone (PEEK), polybenzimidazole (PBI), or acrylonitrile-butadiene-styrene (ABS) resin. A melting point of the first member 150 is higher than a melting point of the material supplied from the material supply unit 10. For example, when the material supplied from the material supply unit 10 is ABS, the material of the first member 150 is PEEK, PBI, or the like. For example, when the material supplied from the material supply unit 10 is PEEK, the material of the first member 150 is PBI or the like.

The second member 152 is provided between the first member 150 and the communication hole 126. The second member 152 is provided closer to the communication hole 126 than the first member 150. In the example illustrated in FIGS. 4 and 5, the second member 152 is provided inside the first member 150, outside the first member 150, and in a +Y-axis direction of the first member 150. The communication hole 126 is provided in the second member 152. The second member 152 has a shape surrounding the communication hole 126 when viewed from the Y-axis direction.

Thermal conductivity of the second member 152 is different from thermal conductivity of the first member 150. Specifically, the thermal conductivity of the first member 150 is lower than the thermal conductivity of the second member 152. The material of the second member 152 is, for example, metal such as stainless steel (SUS).

For example, a difference between the thermal conductivity of the first member 150 and the thermal conductivity of the second member 152 is smaller when the material supplied from the material supply unit 10 is crystalline than when the material is amorphous. In other words, when the material to be supplied is amorphous, the materials of the members 150 and 152 are selected such that the difference between the thermal conductivity of the first member 150 and the thermal conductivity of the second member 152 is a first difference Δ1. When the material to be supplied is crystalline, the materials of the members 150 and 152 are selected such that the difference between the thermal conductivity of the first member 150 and the thermal conductivity of the second member 152 is a second difference Δ2 smaller than the first difference Δ1. Examples of the amorphous material include an ABS resin. Examples of the crystalline resin include PEEK.

When viewed from the Y-axis direction, an area of the first member 150 is, for example, smaller when the material supplied from the material supply unit 10 is crystalline than when the material is amorphous. In other words, when the material to be supplied is amorphous, the first member 150 is provided such that the area of the first member 150 is a first area S1. When the material to be supplied is crystalline, the first member 150 is provided such that the area of the first member 150 is a second area S2 smaller than the first area S1.

When viewed from the Y-axis direction, the area of the second member 152 may be, for example, larger when the material supplied from the material supply unit 10 is crystalline than when the material is amorphous. When the material to be supplied is amorphous, the area of the first member 150 may be larger than the area of the second member 152. When the material to be supplied is crystalline, the area of the first member 150 may be smaller than the area of the second member 152.

The second member 152 is provided with the second groove 124. The second groove 124 is not provided in the first member 150. Since the first member 150 has low thermal conductivity, it is difficult to transfer the heat of the heater 130 to the supplied material, and the material is difficult to melt. Therefore, even if the second groove 124 is provided in the first member 150, it is difficult to guide the molten material to the communication hole 126. The first member 150 is separated from the heater 130. The second member 152 is in contact with, for example, the heater 130. The second member 152 is provided between the first member 150 and the heater 130.

In the illustrated example, the second member 152 is provided outside the first member 150. Although not shown, a cooling pipe is provided on an outer peripheral side of the barrel 120. Therefore, by providing the second member 152 having high thermal conductivity outside the first member 150, the temperature of a portion outside the first member 150 can be lowered.

1.1.4. Surface Roughness of Flat Screw

Figure 6:
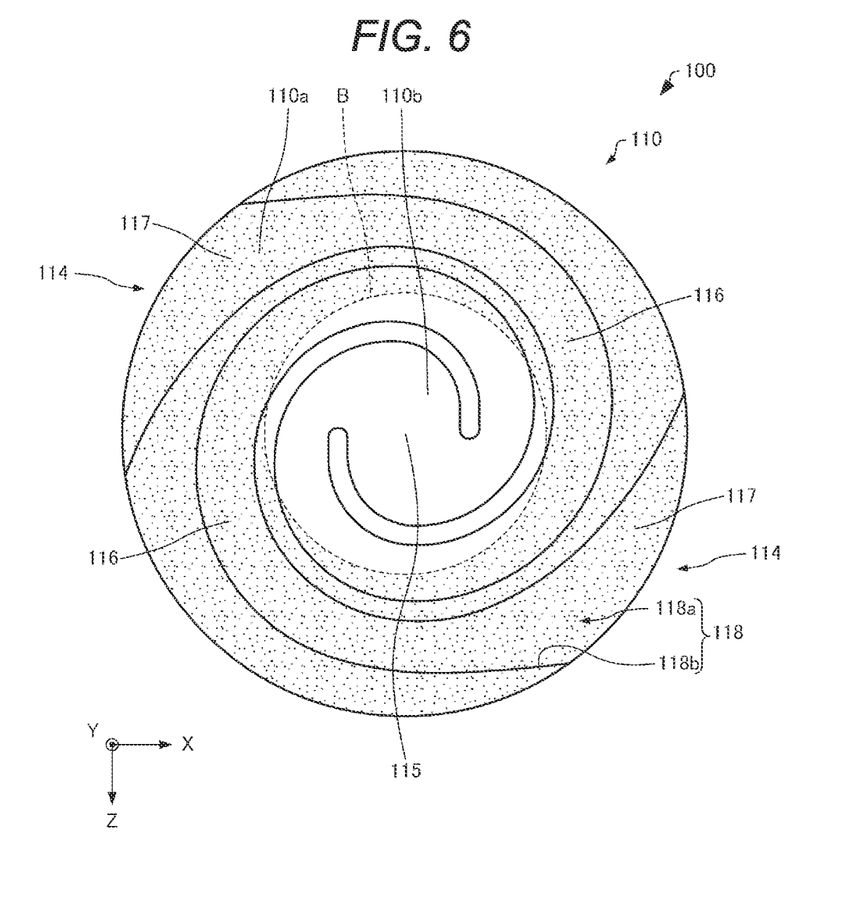
FIG. 6 is a diagram schematically showing the flat screw of the injection molding apparatus according to the first embodiment.

FIG. 6 is a diagram schematically showing the flat screw 110. As shown in FIG. 6, the flat screw 110 has an outer peripheral portion 110a and a central portion 110b. The outer peripheral portion 110a is a portion including the material introduction portion 117 of the first groove 114 provided in the flat screw 110. In the illustrated example, the outer peripheral portion 110a has a ring shape. The central portion 110b is a portion including the groove central portion 115 of the first groove 114. In the illustrated example, the shape of the central portion 110b is a circle. In the illustrated example, a boundary line B between the outer peripheral portion 110a and the central portion 110b is a curved line formed by connecting middle points between the outer periphery of the flat screw 110 and a center of the flat screw 110 when viewed from the Y axis direction.

A surface roughness Ra of an inner surface 118 of the first groove 114 is larger in the outer peripheral portion 110a of the flat screw 110 than in the central portion 110b. The inner surface 118 is a surface of the flat screw 110 defining the first groove 114. The inner surface 118 has a bottom surface 118a and a side surface 118b. Here, the "surface roughness Ra of the inner surface 118 is larger in the outer peripheral portion 110a than in the central portion 110b" means that the surface roughness Ra of at least one of the bottom surface 118a and the side surface 118b is larger in the outer peripheral portion 110a than in the central portion 110b. The bottom surface 118a and the side surface 118b are, for example, orthogonal to each other.

The surface roughness Ra of the inner surface 118 in the outer peripheral portion 110a is, for example, greater than 1.0 μm. The surface roughness Ra of the inner surface 118 in the central portion 110b is, for example, smaller than 0.5 μm. The surface roughness Ra can be measured by, for example, an atomic force microscope (AFM).

The flat screw 110 having the surface roughness Ra as described above is formed, for example, as follows. After the flat screw 110 is processed to form the first groove 114, the central portion 110b is polished and the outer peripheral portion 110a is not polished. Therefore, the surface roughness Ra can be made different between the outer peripheral portion 110a and the central portion 110b. Alternatively, after the flat screw 110 is processed to form the first groove 114, the central portion 110b is covered with a mask layer, and the outer peripheral portion 110a is blasted. Therefore, the surface roughness Ra can be made different between the outer peripheral portion 110a and the central portion 110b. The material of the flat screw 110 is, for example, SUS.

1.1.5. Operation and Effect

In the plasticizing apparatus 60, the barrel 120 includes the first member 150 and the second member 152 having the thermal conductivity different from that of the first member 150, and the second member 152 is provided closer to the communication hole 126 than the first member 150. Therefore, in the plasticizing apparatus 60, for example, compared to a case where the thermal conductivity of the first member and the thermal conductivity of the second member are the same, it is easy to make a difference between the temperature of the communication hole 126 and the temperature of the outer periphery of the barrel 120. Accordingly, in the plasticizing apparatus 60, a temperature gradient can be appropriately controlled from the outer periphery of the barrel 120 toward the communication hole 126, and stable plasticization can be implemented.

In the plasticizing apparatus 60, the thermal conductivity of the first member 150 is lower than the thermal conductivity of the second member 152. Therefore, in the plasticizing apparatus 60, it is easy to form the temperature gradient in which the temperature increases from the outer periphery of the barrel 120 toward the communication hole 126.

In the plasticizing apparatus 60, the first member 150 and the second member 152 have a shape surrounding the communication hole 126. Therefore, in the plasticizing apparatus 60, as compared with a case where the first member and the second member do not have a shape surrounding the communication hole, the temperature gradient is easily formed from the outer periphery of the barrel 120 toward the communication hole 126.

In the plasticizing apparatus 60, the first member 150 is formed by subjecting the facing surface 122 to the surface treatment. Therefore, in the plasticizing apparatus 60, for example, the barrel 120 including the first member 150 and the second member 152 can be formed without welding the first member to another member.

Although not illustrated, the second member 152 may be formed by the surface treatment instead of the first member 150, or both the first member 150 and the second member 152 may be formed by the surface treatment.

In the plasticizing apparatus 60, the difference between the thermal conductivity of the first member 150 and the thermal conductivity of the second member 152 is smaller when the material is crystalline than when the material is amorphous. It is more difficult to plasticize the material when the material is crystalline than when the material is amorphous. Therefore, in the plasticizing apparatus 60, the thermal conductivity of the first member 150 is made closer to the thermal conductivity of the second member 152 when the material is crystalline than when the material is amorphous, so that the heat is easily transmitted to the material also at the outer periphery of the barrel 120, and thus it is possible to promote the plasticization. Therefore, in the plasticizing apparatus 60, the temperature gradient suitable for the material can be formed by changing the material of at least one of the first member 150 and the second member 152. For example, even when the material to be supplied is an elastomer, the temperature can be easily controlled. Therefore, an injection amount can be increased.

In the plasticizing apparatus 60, when viewed from the direction of the rotation axis RA of the drive motor 64, the area of the first member 150 is smaller when the material is crystalline than when the material is amorphous. As described above, it is more difficult to plasticize the material when the material is crystalline than when the material is amorphous. Therefore, in the plasticizing apparatus 60, the area of the first member 150 is made smaller when the material is crystalline than when the material is amorphous, so that the heat is easily transmitted to the material even at the outer periphery of the barrel 120, and thus it is possible to promote the plasticization. Therefore, in the plasticizing apparatus 60, the temperature gradient suitable for the material can be formed by changing the area of the first member 150.

In the plasticizing apparatus 60, the surface roughness Ra of the inner surface 118 of the first groove 114 is larger in the outer peripheral portion 110a of the flat screw 110 than in the central portion 110b. For example, when the surface roughness Ra of the outer peripheral portion of the flat screw is less than or equal to the central portion, the material may be adsorbed to the flat screw at the outer peripheral portion, and the material may not be conveyed to the communication hole. In particular, when the material is an elastomer or a multilayer instruction model (MIM) material, such a phenomenon is likely to occur.

In view of the above problem, in the plasticizing apparatus 60, the surface roughness Ra of the inner surface 118 of the outer peripheral portion 110a is set to be larger than the surface roughness Ra of the inner surface 118 of the central portion 110b. Therefore, a contact area between the material and the flat screw 110 can be reduced to prevent the adsorption of the material, and the material can be conveyed to the communication hole 126. When the surface roughness Ra is large, for example, since the material does not enter a concave portion located between two convex portions constituting the surface of the inner surface 118, the contact area between the material and the flat screw 110 can be reduced. Further, since it is possible to prevent the adsorption of the material to the flat screw 110, it is possible to prevent a variation in the injection amount.

Further, in the plasticizing apparatus 60, by making the surface roughness Ra of the inner surface 118 of the central portion 110b smaller than the surface roughness Ra of the inner surface 118 of the outer peripheral portion 110a, the melted material can be smoothly conveyed to the communication hole 126.

2. Second Embodiment 2.1. Injection Molding Apparatus

Figure 7:
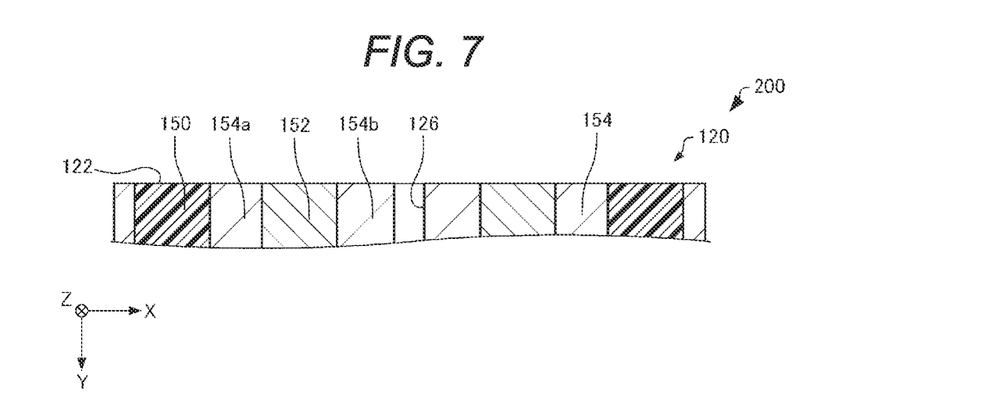
FIG. 7 is a cross-sectional view schematically showing a barrel of an injection molding apparatus according to a second embodiment.

Next, an injection molding apparatus according to a second embodiment will be described with reference to the drawings. FIG. 7 is a cross-sectional view schematically showing the barrel 120 of an injection molding apparatus 200 according to the second embodiment.

Hereinafter, in the injection molding apparatus 200 according to the second embodiment, members having the same functions as those of the constituent members of the injection molding apparatus 100 according to the first embodiment described above are denoted by the same reference numerals, and a detailed description thereof will be omitted.

In the above-described injection molding apparatus 100, as shown in FIG. 5, the first member 150 is formed by subjecting the facing surface 122 to a surface treatment.

On the other hand, in the injection molding apparatus 200, as shown in FIG. 7, the first member 150 is not formed by the surface treatment. The first member 150 is formed, for example, by being welded to another member.

In the injection molding apparatus 200, the barrel 120 includes the first member 150, the second member 152, and a third member 154. In the illustrated example, the third member 154 includes a first portion 154a provided between the first member 150 and the second member 152 and a second portion 154b provided between the second member 152 and the communication hole 126 when viewed from the Y-axis direction. The thermal conductivity of the first portion 154a is, for example, higher than the thermal conductivity of the first member 150 and lower than the thermal conductivity of the second member 152. The thermal conductivity of the second portion 154b is, for example, higher than the thermal conductivity of the second member 152. The material of the first portion 154a and the second portion 154b is not particularly limited.

2.2 Modification

Figure 8:
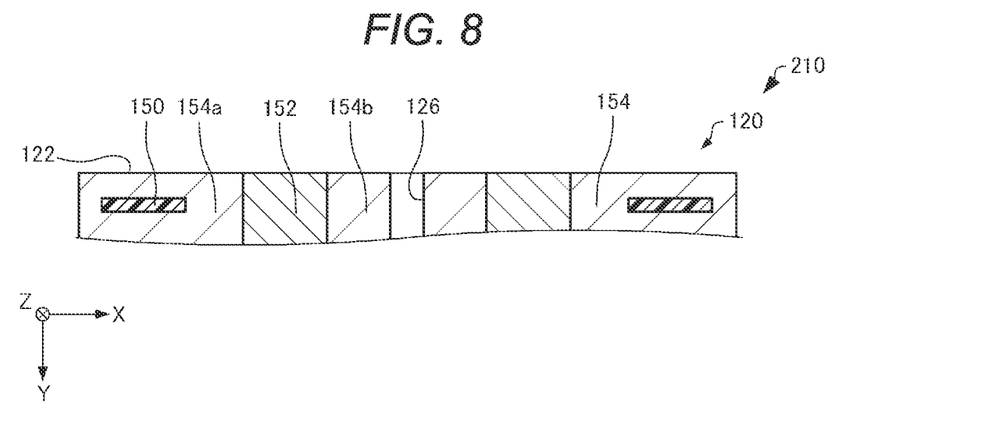
FIG. 8 is a cross-sectional view schematically showing a barrel of an injection molding apparatus according to a modification of the second embodiment.

Next, an injection molding apparatus according to a modification of the second embodiment will be described with reference to the drawings. FIG. 8 is a cross-sectional view schematically showing the barrel 120 of an injection molding apparatus 210 according to the modification of the second embodiment. Hereinafter, in the injection molding apparatus 210 according to the modification of the second embodiment, members having the same functions as those of the constituent members of the injection molding apparatus 200 according to the second embodiment described above are denoted by the same reference numerals, and detailed description thereof will be omitted.

In the injection molding apparatus 200 described above, as shown in FIG. 7, the first member 150 forms the facing surface 122 of the barrel 120.

On the other hand, in the injection molding apparatus 210, as shown in FIG. 8, the first member 150 does not form the facing surface 122 and is provided so as to be surrounded by the third member 154. The first member 150 is sandwiched in the third member 154. The first member 150 is provided between the facing surface 122 and the heater 130. The second member 152 is provided between the facing surface 122 and the heater 130.

Examples of the material supplied from the material supply unit 10 include materials having various materials such as a thermoplastic material, a metal material, and a ceramic material as main materials. Here, the term "main material" refers to a material serving as a center forming a shape of a molded product, and refers to a material having a content of 50% by weight or more in the molded product. The above-described material includes a material obtained by melting the main material alone or a material obtained by melting the main material and a part of components contained in the main material into a paste shape.

For example, a thermoplastic resin can be used as the thermoplastic material. Examples of the thermoplastic resin include general-purpose engineering plastics such as an ABS resin, polypropylene (PP), polyethylene (PE), polyacetal (POM), polyvinyl chloride (PVC), polyamide (PA), polylactic acid (PLA), polyphenylene sulfide (PPS), polycarbonate (PC), modified polyphenylene ether, polybutylene terephthalate, and polyethylene terephthalate; and engineering plastics such as polysulfone, polyethersulfone, polyphenylene sulfide, polyarylate, polyimide, polyamideimide, polyetherimide, and PEEK.

Additives such as a wax, a flame retardant, an antioxidant, or a heat stabilizer may be mixed into the thermoplastic material, in addition to a pigment, a metal and a ceramic. In the plasticizing apparatus 60, the thermoplastic material is plasticized and converted into a molten state by rotation of the flat screw 110 and heating of the heater 130. The molten material produced in this manner is injected from the nozzle 80 and then cured by a decrease in temperature. It is desirable that the thermoplastic material is discharged from the nozzle 80 in a state of being completely melted by being heated to a temperature equal to or higher than a glass transition point thereof.

In the plasticizing apparatus 60, for example, a metal material may be used as the main material instead of the above-described thermoplastic material. In this case, it is desirable that a component that melts at the time of generating a molding material is mixed with a powder material obtained by powdering the metal material, and the mixture is input to the plasticizing apparatus 60.

Examples of the metal material include a single metal of magnesium (Mg), iron (Fe), cobalt (Co) or chromium (Cr), aluminum (Al), titanium (Ti), copper (Cu), nickel (Ni), or an alloy containing one or more of these metals, or maraging steel, stainless steel, cobalt chrome molybdenum, titanium alloy, nickel alloy, aluminum alloy, cobalt alloy, and cobalt chromium alloy.

In the plasticizing apparatus 60, the ceramic material can be used as the main material instead of the above-described metal material. Examples of the ceramic material include an oxide ceramic such as silicon dioxide, titanium dioxide, aluminum oxide, and zirconium oxide, and a non-oxide ceramic such as aluminum nitride.

The powder material of the metal material or the ceramic material supplied from the material supply unit 10 may be a mixed material obtained by mixing a plurality of types of powder of a single metal, powder of an alloy, or powder of a ceramic material. The powder material of the metal material or the ceramic material may be coated with, for example, the above-described thermoplastic resin or a thermoplastic resin other than the above-described thermoplastic resin. In this case, in the plasticizing apparatus 60, the thermoplastic resin may be melted to exhibit fluidity.

For example, a solvent may be added to the powder material of the metal material or the ceramic material supplied from the material supply unit 10. Examples of the solvent include water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetates, sulfoxide-based solvents such as dimethyl sulfoxide and diethyl sulfoxide, pyridine-based solvents such as pyridine, γ-picoline, and 2,6-lutidine, tetraalkylammonium acetates (such as tetrabutylammonium acetate), and ionic liquids such as butyl carbitol acetate.

In addition, for example, a binder may be added to the powder material of the metal material or the ceramic material supplied from the material supply unit 10. Examples of the binder include acrylic resins, epoxy resins, silicone resins, cellulose-based resins, other synthetic resins, polylactic acid (PLA), polyamide (PA), polyphenylene sulfide (PPS), PEEK, and other thermoplastic resins.

3. Third Embodiment

Figure 9:
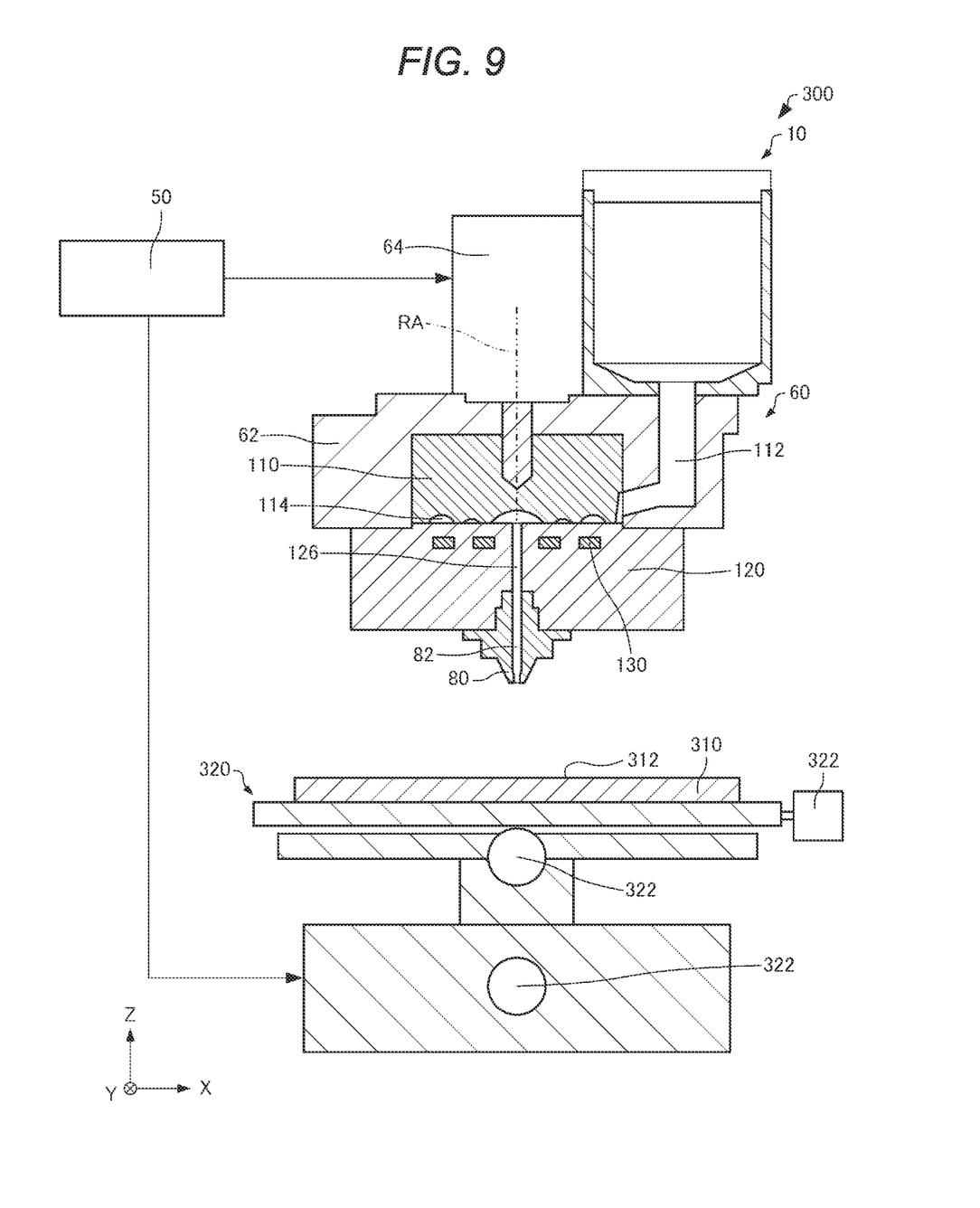
FIG. 9 is a cross-sectional view schematically showing a three-dimensional shaping apparatus according to a modification of a third embodiment.

Next, a three-dimensional shaping apparatus according to a third embodiment will be described with reference to the drawings. FIG. 9 is a cross-sectional view schematically showing a three-dimensional shaping apparatus 300 according to the present embodiment.

For example, as shown in FIG. 9, the three-dimensional shaping apparatus 300 includes the material supply unit 10, the control unit 50, the plasticizing apparatus 60, the nozzle 80, a stage 310, and a movement mechanism 320. The plasticizing apparatus 60 includes, for example, the screw case 62, the drive motor 64, the flat screw 110, the barrel 120, and the heater 130.

The nozzle 80 discharges the molten material supplied from the plasticizing apparatus 60 toward the stage 310. Specifically, the three-dimensional shaping apparatus 300 drives the movement mechanism 320 to change a relative position between the nozzle 80 and the stage 310 while discharging the molten material from the nozzle 80 to the stage 310. Accordingly, the three-dimensional shaping apparatus 300 shapes a three-dimensional shaped object having a desired shape on the stage 310.

The stage 310 is moved by the movement mechanism 320. The three-dimensional shaped object is formed on a shaping surface 312 of the stage 310. Although the molten material may be directly laminated on the stage 310, a sample plate may be provided on the stage 310, and the three-dimensional shaped object may be formed on the sample plate.

The movement mechanism 320 changes the relative position between the nozzle 80 and the stage 310. In the illustrated example, the movement mechanism 320 moves the stage 310 with respect to the nozzle 80. The movement mechanism 320 is implemented by, for example, a three-axis positioner that moves the stage 310 in the X-axis direction, the Y-axis direction, and the Z-axis direction by a driving force of three motors 322. The motor 322 is controlled by the control unit 50.

The movement mechanism 320 may be implemented to move the nozzle 80 without moving the stage 310. Alternatively, the movement mechanism 320 may be implemented to move both the nozzle 80 and the stage 310.

The above-described embodiments and modifications are merely examples, and the present disclosure is not limited thereto. For example, it is also possible to appropriately combine each embodiment and each modification.

The present disclosure includes a configuration substantially the same as the configuration described in the embodiments, for example, a configuration having the same function, method and result, or a configuration having the same object and effect. The present disclosure includes a configuration in which a non-essential portion of the configuration described in the embodiment is replaced. The present disclosure includes a configuration having the same action effect as the configuration described in the embodiment, or a configuration capable of achieving the same object. The present disclosure includes a configuration in which a known technique is added to the configuration described in the embodiments.

The following contents are derived from the above embodiments.

A plasticizing apparatus according to an aspect is a plasticizing apparatus plasticizing a material, the plasticizing apparatus including: a drive motor; a screw rotated by the drive motor and having a groove forming surface in which a groove is formed; and a barrel having a facing surface that faces the groove forming surface and provided with a heater and a communication hole. The barrel includes a first member, and a second member having thermal conductivity different from that of the first member, and the second member is provided closer to the communication hole than the first member.

According to the plasticizing apparatus, stabilized plasticization can be implemented.

In an aspect of the plasticizing apparatus, the thermal conductivity of the first member may be lower than the thermal conductivity of the second member.

According to the plasticizing apparatus, it is easy to form a temperature gradient in which a temperature increases from an outer periphery of the barrel toward the communication hole.

In an aspect of the plasticizing apparatus, the first member and the second member may have a shape surrounding the communication hole.

According to the plasticizing apparatus, the temperature gradient is easily formed from the outer periphery of the barrel toward the communication hole, as compared with a case where the first member and the second member do not have the shape surrounding the communication hole.

In an aspect of the plasticizing apparatus, at least one of the first member and the second member may be formed by subjecting the facing surface to a surface treatment.

In the plasticizing apparatus, for example, the barrel having the first member and the second member can be formed without welding the first member to another member.

In an aspect of the plasticizing apparatus, a difference between the thermal conductivity of the first member and the thermal conductivity of the second member may be smaller when the material is crystalline than when the material is amorphous.

According to the plasticizing apparatus, the temperature gradient suitable for the material can be formed.

In an aspect of the plasticizing apparatus, an area of the first member may be smaller when the material is crystalline than when the material is amorphous, as viewed from a direction of a rotation axis of the drive motor.

According to the plasticizing apparatus, the temperature gradient suitable for the material can be formed.

In an aspect of the plasticizing apparatus, a surface roughness of an inner surface of the groove may be larger in an outer peripheral portion of the screw than in a central portion of the screw.

According to the plasticizing apparatus, it is possible to prevent adsorption of the material to the screw and convey the material to the communication hole.

An aspect of an injection molding apparatus includes: a plasticizing apparatus plasticizing a material into a molten material; and a nozzle injecting the molten material supplied from the plasticizing apparatus into a molding mold. The plasticizing apparatus includes a drive motor, a screw rotated by the drive motor and having a groove forming surface in which a groove is formed, and a barrel having a facing surface that faces the groove forming surface and provided with a heater and a communication hole. The barrel includes a first member, and a second member having thermal conductivity different from that of the first member, and the second member is provided closer to the communication hole than the first member.

An aspect of a three-dimensional shaping apparatus includes: a plasticizing apparatus plasticizing a material into a molten material; and a nozzle discharging the molten material supplied from the plasticizing apparatus toward a stage. The plasticizing apparatus includes a drive motor, a screw rotated by the drive motor and having a groove forming surface in which a groove is formed, and a barrel having a facing surface that faces the groove forming surface and provided with a heater and a communication hole. The barrel includes a first member, and a second member having thermal conductivity different from that of the first member, and the second member is provided closer to the communication hole than the first member.

What is claimed is:

1. A plasticizing apparatus plasticizing a material, the plasticizing apparatus comprising:
    a drive motor;
    a screw rotated about a rotation axis by the drive motor and having a groove forming surface in which a first groove is formed, the screw having a shape in which a length of the screw in a direction along the rotation axis is less than a length of the screw in a direction perpendicular to the rotation axis; and
    a barrel having a facing surface that faces the groove forming surface in the direction along the rotation axis and provided with a heater and a communication hole, wherein
    the barrel includes
    a first member different from the heater, and
    a second member having thermal conductivity higher than that of the first member, and
    the second member is provided closer to the communication hole than the first member, wherein the facing surface formed by the second member is provided with a second groove, and the facing surface formed by the first member is not provided with the second groove,
    at least a part of the facing surface is formed by the first member and the second member.

2. The plasticizing apparatus according to claim 1, wherein
    the first member and the second member have a shape surrounding the communication hole.

3. The plasticizing apparatus according to claim 1, wherein
    at least one of the first member and the second member is formed by subjecting the facing surface to a surface treatment.

4. The plasticizing apparatus according to claim 1, wherein
    a surface roughness of an inner surface of the groove is larger in an outer peripheral portion of the screw than in a central portion of the screw.

5. A three-dimensional shaping apparatus comprising:
    a plasticizing apparatus plasticizing a material into a molten material; and
    a nozzle discharging the molten material supplied from the plasticizing apparatus toward a stage, wherein
    the plasticizing apparatus includes
    a drive motor,
    a screw rotated about a rotation axis by the drive motor and having a groove forming surface in which a groove is formed, the screw having a shape in which a length of the screw in a direction along the rotation axis is less than a length of the screw in a direction perpendicular to the rotation axis, and a barrel having a facing surface that faces the groove forming surface in the direction along the rotation axis and provided with a heater and a communication hole, the barrel includes a first member different from the heater, and a second member having thermal conductivity higher than that of the first member, and the second member is provided closer to the communication hole than the first member, wherein the facing surface formed by the second member is provided with a second groove, and the facing surface formed by the first member is not provided with the second groove, at least part of the facing surface is formed by the first member and the second member.

6. The plasticizing apparatus according to claim 1, wherein the heater is disposed within the barrel.

7. The three-dimensional shaping apparatus according to claim 5, wherein the heater is disposed within the barrel.

8. The plasticizing apparatus according to claim 1, wherein the communication hole is formed in the second member.

9. The plasticizing apparatus according to claim 4, wherein the surface roughness of the inner surface of the first groove in the outer peripheral portion is greater than 1.0 μm, and the surface roughness of the inner surface of the first groove in the central portion is smaller than 0.5 μm.

\* \* \* \* \*